June 17, 1941.　　　　E. SANDERS　　　　2,246,012
DRAIN
Filed April 15, 1940
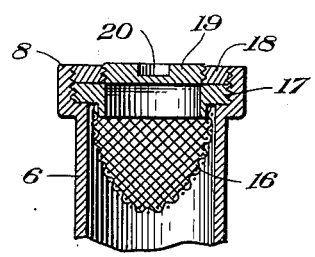
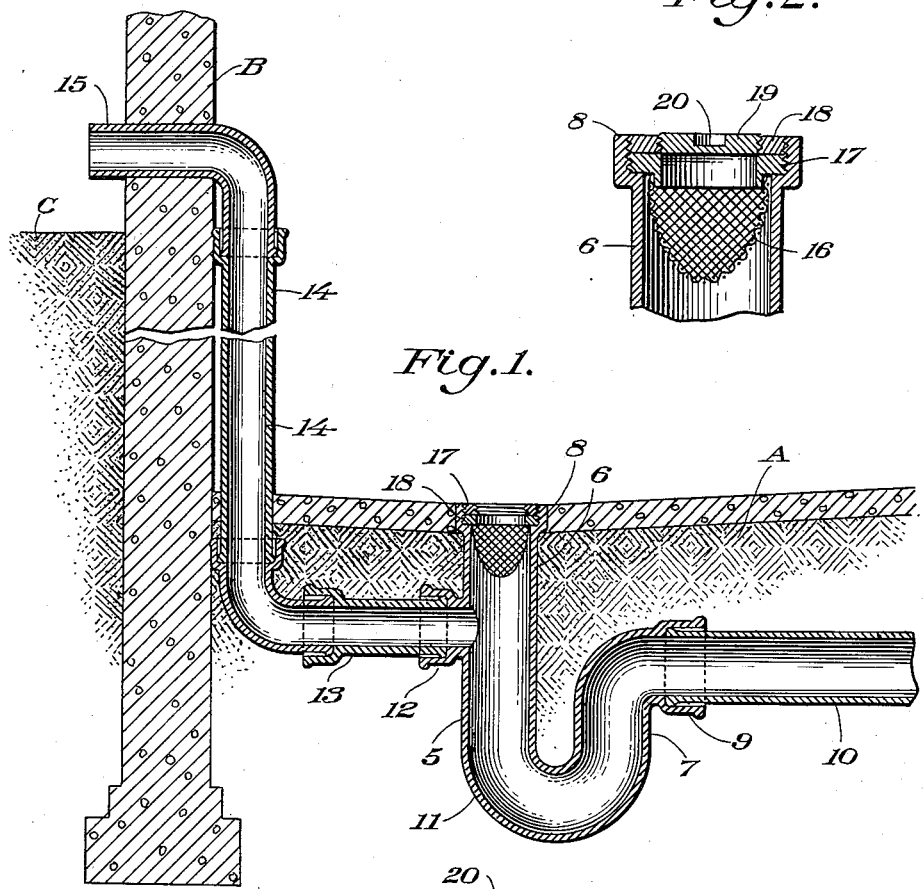
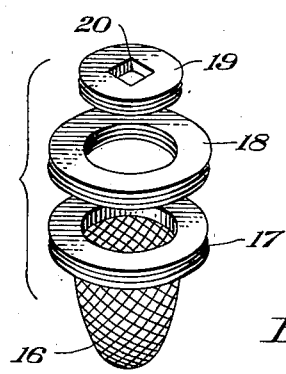
Ernest Sanders
INVENTOR
BY Victor J. Evans & Co.
ATTORNEYS Patented June 17, 1941

2,246,012

UNITED STATES PATENT OFFICE 2,246,012

DRAIN

Ernest Sanders, Elmwood Park, Ill.

Application April 15, 1940, Serial No. 329,798

3 Claims. (Cl. 182—11)

The invention relates to a drain and more especially to a trap adapted when installed for preventing the flooding of basements, cellars or the like of buildings.

The primary object of the invention is the provision of a trap of this character wherein the same when installed in association with a sewerage system and within a basement or cellar of a building will prevent any back water from flowing into the basement, cellar or the like and through the instrumentality of an air vent avoids excessive pressure within the sewer system which results in the breaking of such system.

Another object of the invention is the provision of a trap of this character wherein on installation thereof in association with a sewerage system will exclude foreign matter both from the trap and the system, such as small particles which otherwise on entrance to the system might stop up the same.

A still further object of the invention is the provision of a trap of this character wherein a cellar, basement or the like will be relieved from flooding in that the flood water will be carried off thereby to a sewerage system, the trap being of novel construction and is air vented.

A still further object of the invention is the provision of a trap of this character, which is simple in its construction, thoroughly reliable and efficacious in operation, convenient for placement, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a fragmentary sectional view through a basement, cellar or the like of a building or edifice showing the trap constructed in accordance with the invention installed.

Figure 2 is an enlarged fragmentary vertical sectional view through the strainer fitting for the trap.

Figure 3 is an exploded perspective view of the strainer and adjuncts.

Similar reference characters indicate corresponding parts throughout the several views in the drawing.

Referring to the drawing in detail, A designates generally a portion of the flooring of a basement, cellar or the like of a building or edifice and B a portion of a vertical side wall of the same while C is the exterior elevated ground area which rises a distance above the flooring of the basement, cellar or the like as is customary in the erection of a building or edifice.

The trap constituting the present invention comprises a substantially U-bent pipe-like body 5 having a vertically disposed long arm water inlet portion 6 and a curvilinear, laterally directed, relatively short arm outlet portion 7, respectively, and this body with the said arms is adapted to be sunk in the foundation of a basement, cellar or the like at the flooring thereof to have the arm 6 vertically disposed with the outer free end thereof, which is outwardly flared, forming an inlet mouth 8 flush with the floor surface or level thereof while connected to the outwardly flared nipple end 9 of the short arm portion 7 is a branch of a sewerage system, a portion of this branch being indicated at 10. The bight or bend 11 in the body 5 creates a water seal interiorly of the said body and also functions for a sediment well thereto.

At one side of the portion 6 between the mouth end 8 and the bight or bend 11 is a nipple extension 12 connected with a coupling pipe 13 for union with an air vent pipe 14 having a laterally disposed elbow 15 which is carried through the wall B exteriorly thereof slightly above the ground area C for communication with the atmosphere so that the trap in the working thereof will be air vented for preventing excessive pressure therein and in the sewerage system with which it is associated and in this manner relieving breakage resultant from such excess pressure. The pipe 14 including the coupling pipe 13 and the elbow 15 is constituted by a plurality of pipe sections, these being joined with each other and the joints being fluidtight.

The inlet mouth 8 is internally threaded for detachable engagement therein of a strainer 16, its attaching rim 17 being in threaded engagement with the inlet mouth 8 and this rim is held fast by a lock nut 18 also threaded in the inlet mouth 8 while the said nut has associated therewith and threaded therewith a separable closure plug 19 for the closing of the trap at the inlet end.

The strainer 16 is readily removable for cleaning purposes and also for cleaning the trap. This strainer 16 excludes foreign matter from entering the trap when the latter is letting off water from the basement, cellar or the like through the trap to the sewerage system.

The adaptation and construction of the trap in its installation as before set forth prevents the flooding of a basement, cellar or the like.

The plug 19 is screwed in place before a storm or a flooding condition to prevent water from backing up in the basement, cellar or the like and the vent pipe 14 eliminates pressure on the plug and avoids the bursting of the pipes in the sewerage system or damaging of the trap.

The plug 19 at its outer face presents a wrench-engaging socket 20 so that the said plug can be readily removed with dispatch and conveniently.

What is claimed is:

1. A trap for a basement, cellar or the like countersunk relative to a ground surface, comprising a substantially U-shaped pipe body having a long arm and a short arm, the short arm having an end laterally directed to the vertical and forming a nipple for connection with a sewerage system, the long arm being vertically disposed on placement of the body below the flooring of the basement, cellar or the like, an inlet mouth formed with said long arm, an air vent pipe opening exteriorly of the basement, cellar or the like to the atmosphere and communicative with the said body below the inlet mouth through the long arm of said body, a nipple built with the long arm and connecting the said air vent pipe therewith, a strainer separably fitted within the inlet mouth, and a plug coacting with the strainer for the closing of said inlet mouth.

2. A trap for a basement, cellar or the like countersunk relative to a ground surface, comprising a substantially U-shaped pipe body having a long arm and a short arm, the short arm having an end laterally directed to the vertical and forming a nipple for connection with a sewerage system, the long arm being vertically disposed on placement of the body below the flooring of the basement, cellar or the like, an inlet mouth formed with said long arm, an air vent pipe opening exteriorly of the basement, cellar or the like to the atmosphere and communicative with the said body below the inlet mouth through the long arm of said body, a nipple built with the long arm and connecting the said air vent pipe therewith, a strainer separably fitted within the inlet mouth, a plug coacting with the strainer for the closing of said inlet mouth, and means having the plug fitted therewith and securing the strainer in the inlet mouth.

3. The combination with a trap having a long arm provided with an enlarged mouth at its upper end and internally threaded, a cup shaped strainer within the trap and having a lateral flange at its upper end externally threaded and screwed into the threads of the mouth, a lock ring externally and internally threaded and screwed into the threads of the mouth and engaging the flange of the strainer, and an externally threaded closure plug screwed into the internal threads of the lock ring.

ERNEST SANDERS.